Patented Oct. 20, 1953

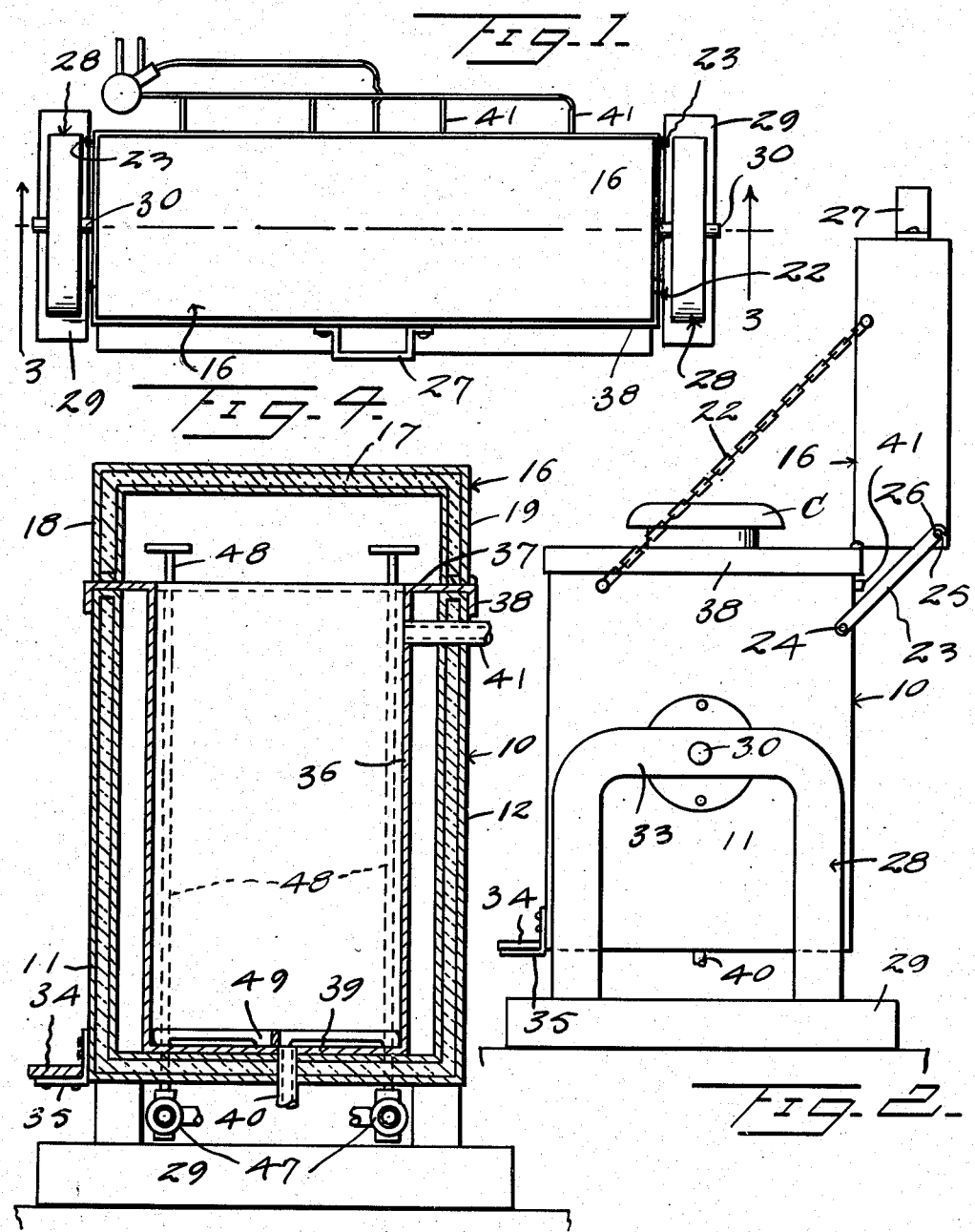

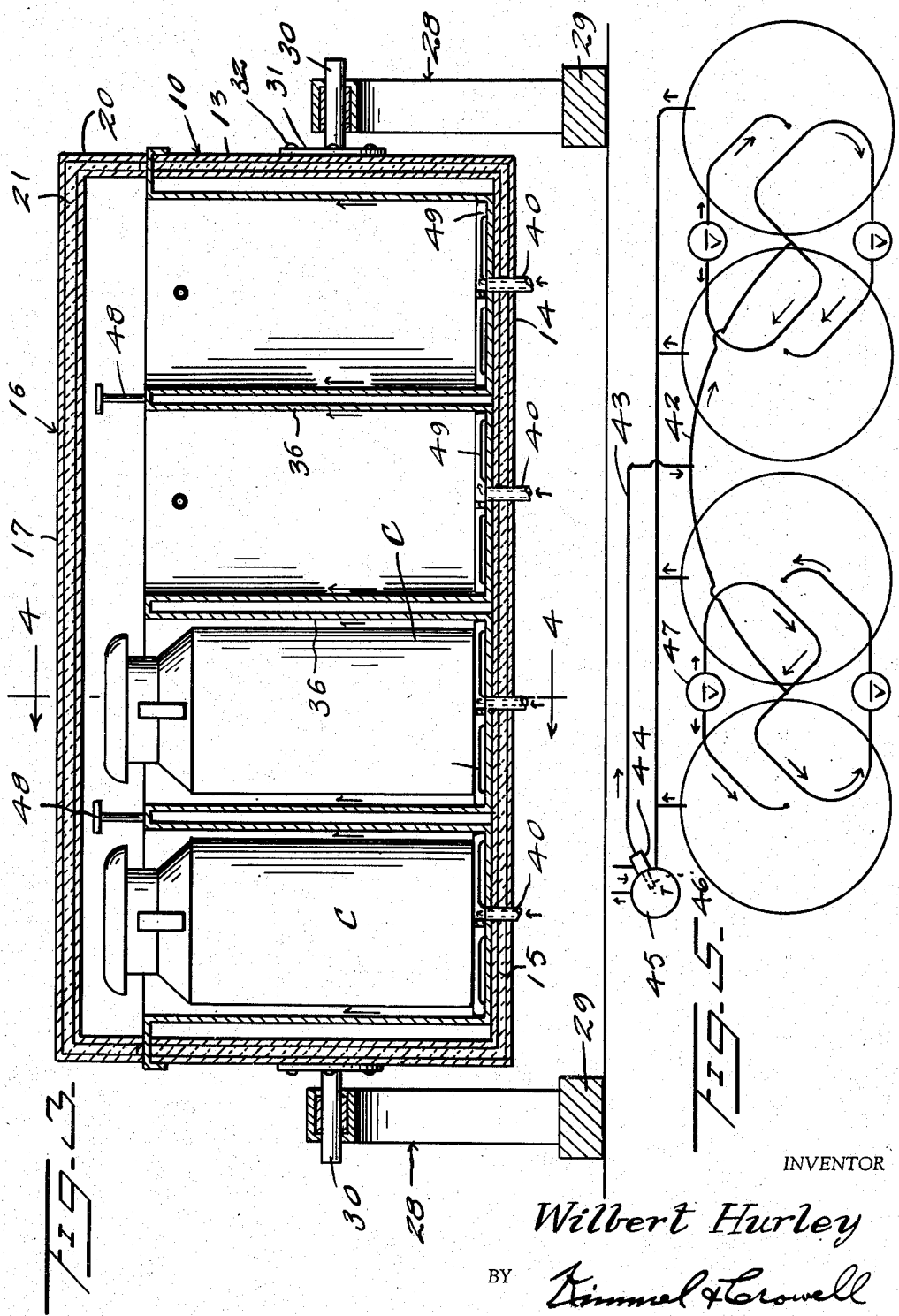

2,656,154

UNITED STATES PATENT OFFICE 2,656,154

THERMOSTATICALLY CONTROLLED MILK COOLER

Wilbert Hurley, Flora, Ind.

Application October 9, 1950, Serial No. 189,224

1 Claim. (Cl. 257—2)

This invention relates to a milk cooling device.

An object of this invention is to provide a milk cooling device which is capable of use and operation where mechanical coolers are not available, so that the milk may be rapidly cooled.

Another object of this invention is to provide a cooling device of this kind which uses liquid, such as water, for a cooling medium and provides for circulating cooling water about the milk cans.

A further object of this invention is to provide a milk cooling device which is so constructed that the device may be agitated as the water is being circulated so as to agitate the milk in the cans.

A further object of this invention is to provide a device of this kind which is so constructed and arranged that the device may be tilted to facilitate the placement or removal of the milk cans.

A further object of this invention is to provide in a cooling system of this kind, a thermal valve connected with the outlet so as to regulate the flow of the water by the temperature of the water leaving the cooler.

With the above and other objects in view, my invention consists in the arrangement, combination and details of construction disclosed in the drawings and specification, and then more particularly pointed out in the appended claim.

In the drawings:

Figure 1 is a plan view of a milk cooler constructed according to an embodiment of this invention.

Figure 2 is an end elevation of the device with the cover in raised position.

Figure 3 is a sectional view taken on the line 3—3 of Figure 1.

Figure 4 is a sectional view taken on the line 4—4 of Figure 3.

Figure 5 is a diagrammatic view showing the circulating system.

Figure 6 is a plan view of the grating appearing in the bottom of the container of Figure 4.

Referring to the drawings, the numeral 10 designates generally a housing which is formed of hollow front and rear walls 11 and 12 and hollow end walls 13. A hollow bottom wall 14 is connected to the front, rear and end walls, and heat insulating means 15 is disposed in the spaces between the hollow walls. A cover generally designated as 16 is hingedly secured to the rear wall 12 and is formed of a hollow heat insulated top 17, front and rear walls 18 and 19, and end walls 20.

Heat insulating means 21 is also disposed in the hollow spaces of the cover 16. The cover 16 is adapted to be limited in its upward and rearward swinging by means of one or more flexible members 22 in the form of a chain, and the cover 16 is adapted to be latched or locked in its vertical open position as shown in Figure 2 by means of a latching link 23 which is pivoted as at 24 to one end of the housing 10 and is formed with a notch 25 which is engageable over a headed pin 26 carried by the cover 16.

A bail or handle 27 is fixedly secured to the front wall 18 of the cover. The housing 10 is pivotally mounted on supporting structure which includes a pair of inverted U-shaped supporting members 28 secured to a pair of base members 29. The base members 29 are disposed below the bottom of the housing 10, and the end walls 13 of the housing have aligned trunnions 30 extending therefrom which are carried by plates 31 secured by fastening members 32 to the end walls 13.

The trunnions 30 rotatably extend through the bights 33 of the supporting members 28 and as shown in Figures 2 and 3, the housing 10 is positioned above the ground or floor surface so that the housing may be tilted or agitated for agitating the milk in milk cans which are being cooled.

In order to provide a means whereby the housing 10 may be tilted while the cans are being replaced or removed, a forwardly projecting ledge 34 is secured by L-shaped brackets 35 to the lower front portion of the housing 10. The ledge 34 is pushed downwardly by placing a foot thereon so that the two hands of the operator may be used in removing or replacing milk cans from the housing. The housing 10 has positioned therein a plurality of cylindrical receptacles 36 which are carried by a top plate 37 formed with marginal flanges 38 extending over the upper edges of the housing 10.

The receptacles or cylindrical members 36 include a bottom wall 39, and a water or liquid inlet pipe 40 is connected with the central portion of the bottom wall 39. An outlet or exhaust pipe 41 is extended through the upper portion of the housing 10 and communicates with the interior of the receptacle or cylindrical member 36 adjacent the upper portion of the receptacle.

Water or other cooling liquid is adapted to be circulated through each receptacle 36 from a manifold pipe 42 which is connected by means of a pipe 43 to a regulating valve 44. The regulating valve 44 is secured to an exhaust liquid receiver or tank 45, and the valve 44 is a thermostatically operated valve having a thermal element 46 of conventional construction projecting into the discharge tank or receiver 45 so that the flow of liquid from the supply source through the valve 44 and into the receptacles is regulated and controlled by the temperature of the liquid in the discharge tank 45.

A manually operated valve 47 is interposed in each inlet pipe 40 and includes an elongated stem 48 projecting upwardly in the housing 10 and above the top member 37. There is a valve 47 for each receptacle 36 so that the cooling medium may be discharged into selected ones of the receptacles 36. A milk can C is adapted to be placed in each receptacle 36, and the can C is adapted to rest on a grating 49 which is disposed on the bottom of each receptacle 36. This grating 49 provides a means whereby the water or liquid discharged into the bottom of each receptacle 16 may readily flow upwardly about the entire surface of the can C for cooling the milk within the can.

In the use and operation of this device the milk cans are placed in several receptacles 36 and with the cover of the receptacle of the housing in lowered or closed position the cooling liquid is circulated through the several receptacles. The housing 10 may be agitated as the liquid is circulating therethrough by rocking the housing 10 on the supporting members 28. In the placement or removal of the cans the housing 10 may be tilted forwardly at its upper end with the lid or cover 16 in the raised position by stepping on the ledge 34. The forward tilting of the housing 10 will make it relatively easy to replace or remove the filled milk cans from the receptacles 36.

What is claimed is:

A liquid cooler comprising a housing formed of hollow front and rear walls, hollow end walls and a hollow bottom, heat insulating means in said walls, a heat insulated cover for said housing, a plurality of spaced vertically disposed cylindrical receptacles adapted for the reception of individual liquid containers in said housing, a grating spaced from the bottom of each receptacle to permit circulation of coolant beneath said liquid containers, an inlet adjacent the bottom of each receptacle, an outlet adjacent the top of each receptacle, a common manifold supplying all inlets with a coolant fluid, an individual valve adjacent each inlet, an elongated valve stem for each valve extending above the top of said receptacles, a common exhaust for all outlets, an exhaust tank into which said exhaust empties, a thermostatic valve in said manifold, and an actuating element for said thermostatic valve in said exhaust tank whereby the flow of coolant to said receptacles is governed by the temperature of the exhaust therefrom.

WILBERT HURLEY.

References Cited in the file of this patent

UNITED STATES PATENTS

| Number | Name | Date |
|---|---|---|
| 634,639 | Clarke | Oct. 10, 1899 |
| 817,010 | Schutze | Apr. 3, 1906 |
| 1,329,426 | Muckle | Feb. 3, 1920 |
| 1,850,500 | Goble | Mar. 22, 1932 |
| 2,109,694 | Goble | Mar. 1, 1938 |
| 2,249,660 | Lee | July 15, 1941 |
| 2,317,480 | Peters | Apr. 27, 1943 |
| 2,371,807 | Dalzell et al. | Mar. 20, 1945 |